3,040,820
METHOD FOR DRILLING WITH CLEAR WATER
Julius P. Gallus, Tulsa, Okla., assignor to Pan American Petroleum Corporation, Tulsa, Okla., a corporation of Delaware
No Drawing. Filed Feb. 17, 1958, Ser. No. 715,494
5 Claims. (Cl. 175—66)

This invention relates to the drilling of wells. More particularly, it relates to the rotary drilling of wells in which a liquid is circulated in the well.

In the drilling of wells with rotary equipment, a fluid is generally circulated down the drill pipe and up around the drill pipe to remove bit cuttings, lubricate the bit and drill pipe, and perform other functions. Recently, it has been discovered that drilling rates can be greatly increased by use of clear water as the drilling fluid. One difficulty has been that after a few cycles through the well the water is no longer clear, but has a considerable solids content. I have discovered that these solids can be easily and quickly removed by adding to the muddy water a very small amount of acrylamide polymer hydrolyte. Use of such polymers to accomplish rapid and efficient separation of finely divided mineral material from aqueous suspensions is described in detail in Canadian Patent 522,851 issued to David J. Pye et al. on March 20, 1956. Such polymers are available under trademarks such as Separan, Lytron, and the like.

Another difficulty when circulating clear water in a well is that the water leaks away to the formations penetrated. Little, if any, solids are present to build up a filter cake and decrease the rate of loss.

Still another problem in clear water drilling is the removal of cuttings from the well. The clear water does not have sufficient viscosity to lift large cuttings rapidly from the well.

An object of this invention is to decrease the loss of clear water used as a drilling fluid. Another object is to improve the removal of bit cuttings in clear water drilling operations. Other objects will be apparent from the following description and claims.

I have found that loss of drilling fluid to formations drilled with clear water can be greatly decreased by incorporating into the water as it is pumped down the drill pipe a small amount of the same type of acrylamide polymer hydrolytes used to separate solids from the water.

When the polymers are added to the muddy water from the well, the inorganic solids settle rapidly from the water. It might be supposed that at least some of the polymer would remain in solution in the water and would be pumped down the drill pipe to perform its fluid loss reducing function at the bottom of the well. It has been found, however, that almost all the polymer is adsorbed on the surfaces of the solid particles, leaving little, if any, in solution. This is true even if quantities are used greatly in excess of the amount necessary to cause settling of the solids. My process usually includes, therefore, a double addition of the polymers. They are added once as the muddy water leaves the well and enters the mud pits. They must be added again when the substantially solids-free clear water leaves the mud pits and enters the well.

Sometimes the water is sufficiently clear at the pump suction that no addition of the polymers is required as the drilling water leaves the well and enters the mud pits. In such cases my process includes only a single addition to the clear water entering the well. Such uses often occur when only short sections of formation are exposed in a well, as when a well has been cased to a point near the bottom. Sufficient polymer hydrolytes can then return to the surface to cause fairly effective settling of inorganic solids in the mud pits.

When reference is made to "clear water" or to "water substantially free from inorganic solids" it will be understood that the water need be only sufficiently free from inorganic solids to avoid seriously affecting in an adverse manner the fluid loss reducing ability of the hydrolytes. There is even some evidence that a very low concentration, up to about 0.1 percent by weight of inorganic solids, may aid the fluid loss reducing ability of the hydrolytes. Normally, however, the water in the mud pump suction should contain no more than a few tenths of a percent of inorganic solids.

The acrylamide polymer hydrolytes, for my purposes, should have from about 0.8 percent to about 10 percent of the amide groups replaced by carboxyl groups. That is, the hydrolytes should have about 10 to about 120 amide groups for each carboxyl group. The molecular weight of the hydrolytes should be such that a solution containing 0.5 percent by weight of the polymer in distilled water having a pH of 3 to 3.5 and a temperature of $21.5°$ C. has a viscosity of at least 4 centipoises as determined with an Ostwald viscosimeter. The hydrolyte may be prepared by polymerizing acrylamide followed by partial hydrolysis of the polymer. This method is described in more detail in Canadian Patent 522,851. The hydrolyte may also be prepared by co-polymerization of acrylamide and acrylic acid. This method is described in more detail in U.S. Patent 2,775,557 issued to R. L. Morgan on December 25, 1956. This U.S. patent also discloses details of the method in which the pure acrylamide polymer is first prepared and then hydrolyzed. The hydrolyte may contain up to about 15 percent of co-polymerized monomers other than acrylic acid. These may include such materials as styrene, vinyl acetate, acrylonitrile, and the like. Such co-polymers are described in more detail in Canadian Patent 522,850 issued to David J. Pye on March 20, 1956.

U.S. Patent 2,775,557, mentioned above, discloses use of acrylamide polymer hydrolytes in drilling fluids. In these hydrolytes, however, from 10 to 40 percent of the amide groups are replaced by carboxyl groups. The hydrolytes suitable for use in my process, on the other hand, have only 0.8 to 10 percent of the amide groups replaced by carboxyl groups. The reason for the distinction is that the polymers containing more carboxyl groups have a greatly decreased tendency to precipitate solids from suspension. Thus, the hydrolytes containing a large amount of carboxyl groups are compatible with aqueous suspensions of clay used as drilling fluids. These are the subject matter of U.S. Patent 2,775,557. The hydrolytes containing a small amount of carboxyl groups, on the other hand, are quite incompatible with clays and are, for this reason, particularly suitable for drilling with substantially solids-free clear water.

When the terms "acrylamide polymer hydrolyte," "polymer hydrolyte," or simply "hydrolyte" are used hereinafter, it will be understood that these terms mean the polymers, co-polymers, or hydrolyzed polymers described above in which from 0.8 to 10 percent of the amide groups of the pure acrylamide polymer are replaced by carboxyl groups.

The amount of polymer hydrolytes used to cause rapid settling of solids can vary between wide limits. The solids content of water is usually allowed to build up considerably while drilling rapidly at shallow depths before the polymer hydrolytes are used. A concentration of around 0.2 pound per barrel of drilling fluid may used initially to cause settling of solids in the mud pits. This initial treatment is preferably made by spraying an aqueous solution of a polymer hydrolyte over the surface of the mud pits. Thus, if the mud system contains about 500 barrels, about 100 pounds of the polymer hydrolytes dissolved in water may be sprayed over the surface of the pits. Generally, a much lower concentration down to about 0.02 pound per barrel will be adequate.

It is possible to add the initial high concentration of polymer hydrolytes to the drilling fluid as it emerges from the well or as it enters the mud pits. Some time will be required when using this technique, however, to obtain clear water at the pump suction. Whatever method is used to obtain initial clarification, as soon as clear water is obtained at the mud pump suction, the amount of polymer hydrolytes continuously added to the drilling fluid coming from the well should be decreased. The amount added thereafter will depend upon the rate of drilling and the type of formation being drilled. If a shale is being drilled at a high rate, continuous addition of as much as 0.02 pound of the hydrolyte per barrel of drilling fluid coming from the well may be required. If a hard sandstone or limestone relatively free from shale is being drilled slowly, however, as little as 0.001 pound, or even less, may be used per barrel of water from the well. The addition may be intermittent, particularly for the lower concentrations, but preferably should be continuous.

As previously noted, the polymer hydrolytes are strongly adsorbed on solid surfaces. These surfaces will normally adsorb much more of the hydrolyte than the amount required to precipitate the solids. While the concentration figures given above will serve as a general guide, the best rule is simply to add just sufficient of the hydrolytes to the mud coming from the well to produce clear water at the pump suction.

Conditions also govern the amount of polymer hydrolytes added at the pump suction to reduce loss of water to the formations drilled. As little as 0.001 pound per barrel of water being pumped down the well has produced noticeable reduction in loss of fluids to permeable formations being drilled in some field tests. Generally, however, the concentration should be two or three times this minimum value. As much as 0.01 pound per barrel has been added continuously to water pumped down wells while drilling formations having high permeabilities. To recover lost circulation to porous zones, the concentration may be increased to as much as 1.0 pound per barrel in a slug of 10 to 100 barrels of water pumped down the well.

The polymer hydrolytes are solids. In no case should the hydrolytes be added to the mud in the solid form since they are relatively ineffective in this form. They should always be first dissolved in water. The preferred concentration of the aqueous treating solution which is prepared is about 1 percent by weight or about 3 to 4 pounds per 42-gallon barrel of water. Solutions containing higher concentrations are difficult to prepare. In addition, the amount of polymer hydrolytes added to the drilling fluid is so small that only by the use of dilute solutions will the volumes of solution be sufficiently large to be accurately controlled. For example, if the circulating rate of water in a well is about 10 barrels per hour and if only 0.001 pound of polymer hydrolytes per barrel of drilling water is to be added, then the total amount of hydrolytes to be added in an hour is only 0.6 pound. If the treating solution contains 3 pounds of the additive per 42-gallon barrel, this treating solution is added continuously at a rate of only about 8 gallons per hour. This is a very small stream of treating solution. When the term "dilute solution" is used hereinafter, it is intended to mean solutions containing up to about 1.5 percent by weight of the hydrolytes.

Treating solutions can be prepared by simply dumping the required solid polymer hydrolytes into the water in a barrel or tank and stirring. Preferably, the solid powder should be added slowly while stirring vigorously since the powder does not readily go into solution. At least one of the manufacturers of these hydrolytes provides an aspirator type solids disperser which facilitates preparing treating solutions.

Addition of the treating solution to the drilling fluid should generally take place at a point of maximum agitation. For example, the treating solution may be added to the fluid coming from the well at the point where the drilling fluid stream from the shale shaker enters the mud pit. An exception, of course, is the initial spraying of treating solution over the surface of the mud pits. The treating solution to be pumped down the well can be added to the mud pit at a point adjacent the pump intake line. Some drillers prefer to introduce the solution directly into the pump intake line itself.

The process described to this point usually involves double addition of the polymer hydrolytes. This process provides clear water for circulating down the well, the water containing sufficient polymer hydrolytes to decrease loss of water to formations drilled. This process is a distinct improvement over the prior art which circulates water which is not clear and which is lost readily to exposed formations. One problem remains, however. The substantially solids-free water does not lift large bit cuttings out of the well as readily as might be desired. I have found two improvements to my basic process for solving this problem.

I have now discovered that the polymer hydrolytes are capable of precipitating inorganic solids from aqueous solutions in the presence of small amounts of organic colloids, such as sodium carboxymethyl cellulose, starch, or the like. The polymer hydrolytes do not cause flocculation and precipitation of these organic colloids. The inorganic solids precipitate in the presence of the polymer hydrolytes and organic colloids if the viscosity of the dispersion is less than about 4 centipoises. Preferably, the viscosity should be maintained at about 3 centipoises by addition of sodium carboxymethyl cellulose. This increased viscosity aids in lifting the bit cuttings from the well without seriously affecting settling of the inorganic solids. If this technique is to be used, the longest possible settling path through the mud pits should be provided. This is advisable in any case. The advantage is a reduction in the amount of polymer hydrolytes required to provide clear water at the pump suction. The advantage of the long flow path and correspondingly increased settling time is even greater, however, when the viscosity of the water has been increased.

The other technique to increase the removal of bit cuttings from the well is to use occasional slugs or batches of viscous drilling fluid to carry the bit cuttings from the well. This technique is described in more detail and is claimed in general in U.S. patent application S.N. 715,495, filed February 17, 1958, by Moses B. Widess. The Widess application suggests, for example, use of intermittent batches of treating solutions containing high concentrations of polymer hydrolytes to obtain the desired high viscosity. I have found that an improvement to this general process is to employ viscous batches of water prepared by adding salts of polyvalent metals, preferably aluminum chloride, to dilute solutions of polymer hydrolytes. For example, a brine solution containing about 1 percent polymer hydrolytes and ½ percent aluminum chloride by weight has a viscosity of about 200 centipoises at about 80° F. By comparison, the viscosity of a solution containing 1 percent of the hydrolytes alone is about 40 centipoises. Higher viscosities can be obtained by use of higher concentrations of the hydrolytes or salt. Lower viscosities result from use of lower concentrations. This viscous composition has the advantage that it is compatible with the clear water drilling system as a whole. When this slug reaches the surface, it can be simply dumped into the mud pits where the gel settles quickly to the bottom, carrying the bit cuttings with it. Other viscous slugs must be diverted to separate storage to avoid contaminating the clear water.

The slugs may vary from about 10 to about 100 barrels in volume, for example. Larger volumes should, in general, be used in deeper wells since there is more opportunity in such wells for dilution of the slug at both ends by clear water. The frequency of circulating the viscous slugs should vary with the rate of drilling. When drilling rapidly, it may be advisable to inject a slug every hour or even every half hour. When drilling slowly, a slug every day or so may be adequate.

Slugs or batches of the combination of polymer hydrolytes and polyvalent metal salts also perform functions other than carrying out bit cuttings. The material, being more viscous than the solutions of the hydrolytes alone, is more effective in decreasing the permeabilities of formations to which water is being lost from the well. The gel is, for example, able to plug fractures which could not be plugged by the Separan solutions alone. Lost circulation additives, such as wood fibers, cottonseed hulls, cellulose flakes, ground nutshells, or the like, can also be carried along by the batch of viscous material to assist in stopping loss of circulation. The thick gel which penetrates relatively incompetent formations also decreases the tendency of these formations to slough into the well.

The slugs of gel, as they settle to the bottoms of the mud pits, help to impermeabilize these pits and decrease the loss of water to permeable earth formations in which the pits may be dug. Even before slugs of the viscous combination are used in the drilling operation, it may be advisable to spray solutions of polymer hydrolytes and polyvalent metal salts, separately or mixed together, over the surface of the water-filled pit or over the bottom of the pit before filling with water to decrease the loss of water to the permeable earth formations.

My invention will be better understood from consideration of the following examples. The Separan used in the examples consist of commercially available acrylamide polymer hydrolytes falling within the limits noted above. In all the tests water circulation rates were generally in the range of about 5 to 10 barrels per minute.

EXAMPLE I

Solutions containing various concentrations of Separan in brine were prepared. These solutions were forced through short cylindrical sections of Berea sandstone 2 inches in diameter and about ½ inch long. The results are reported in Table 1, together with results of an initial test using the brine containing no Separan.

*Table 1*

| Concentration of Separan, percent by wt.: | Time for 30 ml. to flow through core, sec. |
|---|---|
| None | 5.5 |
| 0.005 | 12 |
| 0.01 | 16 |
| 0.02 | 21 |
| 0.05 | 33 |

It will be apparent that a concentration as low as 0.005 percent of the acrylamide polymer hydrolytes greatly decreased the rate of flow of brine through the core.

EXAMPLE II

A well was drilled with clear water in Scurry County, Texas. The clear water was lost rapidly to permeable formations being drilled. After 600 barrels of water were lost in 24 hours while drilling at about 2,780 feet, addition of Separan to the water at the pump suction was initiated. The Separan was added at a rate of about 1.5 pounds per hour while drilling to 3,000 feet. The rate was decreased to 0.75 pound per hour while drilling from 3,000 feet to 5,000 feet. The total water lost while drilling this 2,220 feet was only 200 barrels.

EXAMPLE III

This field trial was in the Fluvanna Field in Scurry County, Texas. In this field fluid loss to porous zones, especially below 5,000 feet, is severe and necessitates early mud-up and the use of considerable amounts of lost circulation materials.

The volume of the system was 2,000 barrels. Drilling fluid was circulated at 6.0 barrels per minute and passed through a large reserve pit as well as through steel pits of 250 barrels capacity each. As a result of this large pit area and the relatively low circulation rate, the solids drilled up settled before reaching the pump suction. Therefore, flocculating agent addition at the discharge line was not needed. Starting at a depth of 4,995 feet, Separan solution was injected directly into the pump suction at a rate of 1.3 to 4 pounds per hour as a 0.5 to 0.7 percent aqueous solution. The chemical was dissolved in three manifolded chemical barrels placed slightly higher than both pump suction line and the fluid level in the pits to facilitate feeding the chemical into the system.

Electric logs from offset wells were consulted for approximate depths at which high porosity might be anticipated and the reagent added accordingly. Four pounds of Separan per hour were injected from 5,000 to 5,350 feet, a high porosity section, 1.3 pounds per hour from 5,350 to 5,850 feet, a relatively non-porous section, and 2.6 pounds per hour during the interval from 5,850 to 7,560 feet, the point of mud-up. For accurate measurement of the fluid volume changes while drilling the test sections, the drilling fluid was circulated through the three steel pits only, and hourly fluid level measurements were taken and recorded. The fluid loss measured while drilling from 5,075 to 5,350 feet was 300 barrels. Drilling the adjacent well, 1,500 barrels of fluid had been lost over the same interval in spite of the fact that more than 140 sacks of lost circulation additives had been carried in the fluid for lost circulation control.

On the subject well it was for the first time possible in the Fluvanna Field to drill to 7,560 feet without mudding-up. On previously drilled wells mud-up became necessary at or before 5,500 feet. From 6,100 to 7,500 feet sloughing shales, tight hole conditions, and high fluid loss were usually encountered in this area. The use of Separan prevented these difficulties.

Savings realized through high penetration rate, conservation of circulating fluid, mud, and lost circulation materials and long bit life were estimated to total approximately one-half of the average mud cost per well in that area.

There had been some concern that perhaps Separan might permanently plug zones of porosity, thereby preventing the satisfactory use of micro logs for determination of pay zones. Subsequent logs showed no such effect.

EXAMPLE IV

The use of Separan to maintain clear water and reduce fluid loss was tested in a well drilled in Andrews County, Texas. In this test Separan was used successfully from the bottom of the intermediate casing at 5,500 feet to a depth of 11,160 feet. Treatment included injection of about 1 pound per hour of the reagent in solution into the pump and about 1 pound per hour at the flow line to keep the fluid in the pit clear.

During the drilling operations at one time small size of bit cuttings was noted. The smal size of cuttings might have been due to failure of the clear water to lift the cuttings out of the well until they were ground to a small size. Therefore, 0.25 pound of high viscosity sodium carboxymethyl cellulose was added per barrel of drilling water. This increased the viscosity of the water to 3 centipoises and reduced the API fluid loss to 27 cc. Clay flocculation and settling at this viscosity were satisfactory. When the viscosity was increased to 5 centipoises, however, the Separan was unable to cause rapid settling of the inorganic solids. Addition of Separan was discontinued until the viscosity was found to have dropped to below 3 centipoises. At a depth of 11,016 feet—1,000 feet deeper than anyone had ever succeeded in drilling without mud in that area—Separan addition was terminated. At 11,160 feet clay was added to form a mud. No problems were encountered in mudding up. Benefits of using Separan included no hole fill-up, increased penetration rates, faster round trips, and longer bit life than usual.

Several points should be noted in this test. First, the polymer hydrolytes can be used in drilling deep wells. Second, the hydrolytes continued to cause settling of inorganic solids at water viscosities of 3 centipoises, but not at 5 centipoises. Third, the acrylamide polymer hydrolytes are lost rapidly from the water, so there was no difficulty in mudding up after a short period of circulation without adding the hydrolytes.

It is important to note that the drilling contractor on this well offered to drill the next well for 50 cents per foot less if it was agreed to use Separan-treated clear water rather than mud as a drilling fluid.

EXAMPLE V

A test in drilling a well in Lipscomb County, Texas, provided the opportunity to use Separan solutions to regain circulation after complete loss of returns. For the initial treatment, 5 pounds of Separan were distributed over the three steel pits within 15 minutes. At the same time the continuous addition of Separan was begun by injecting 2 pounds per hour at the discharge line for cleaning the drilling fluid and 3 pounds per hour at the pump suction to protect the bore. At 3,923 feet the bit was found to be out of gauge. Reaming of 100 feet of the well was necessary. Although no difficulty had been found in drilling this section originally, returns were completely lost at 3,898 feet while adding 4 pounds of Separan per hour. To combat this loss of circulation, 40 pounds of Separan were dissolved and rapidly injected into the bore within 10 minutes. Full returns were regained after 20 minutes. Approximately 150 barrels of water had been lost during these 30 minutes. At 3,910 feet circulation was lost again and could not be recovered by Separan, leather fiber, or cottonseed hulls. Circulation was finally recovered by adding bentonite to prepare a mud. This mud was used to complete reaming and continue drilling to 4,070 feet. At this point clear water drilling with Separan was resumed and continued to a depth of 5,100 feet.

Two principal points are to be noted from this test. First, Separan slugs can stop lost circulation. Second, in reaming or other rapid drilling, the rate of addition of polymer hydrolytes at the pump suction should be increased to treat the rapidly uncovered formations.

I claim:

1. The method of drilling a well in which water is circulated in said well comprising adding to said water as it leaves the well and enters the mud pits sufficient acrylamide polymer hydrolytes to provide at the pump suction water containing no more than a few tenths percent of inorganic solids, and adding to the water as it leaves the mud pits and enters the well from about 0.001 to about 0.02 pounds per 42-gallon barrel of acrylamide polymer hydrolytes, said hydrolytes in both cases having from about 10 to about 120 amide groups for each carboxyl group and having a viscosity of at least about 4 centipoises for a 0.5 percent by weight aqueous solution of said hydrolytes, and said hydrolytes being added in both cases as an aqueous solution.

2. The method of claim 1 in which said water contains, in addition to said hydrolytes, an organic water-dispersible colloid in an amount sufficient to increase the viscosity of said water, but insufficient to produce a viscosity of more than about 4 centipoises.

3. The method of claim 2 in which said colloid is sodium carboxymethyl cellulose.

4. The method of claim 1 in which viscous aqueous slugs are circulated intermittently down the well, said slugs containing said hydrolytes and a polyvalent metal salt in amounts sufficient to provide the desired viscosity required to assist in lifting bit cuttings to the surface.

5. The method of claim 4 in which said polyvalent metal salt is aluminum chloride.

References Cited in the file of this patent

UNITED STATES PATENTS

| 2,252,669 | Cross et al. | Aug. 12, 1941 |
| 2,775,557 | Morgan | Dec. 25, 1956 |
| 2,827,964 | Sandiford et al. | Mar. 25, 1958 |
| 2,854,407 | Mallory | Sept. 30, 1958 |
| 2,867,584 | Scott | Jan. 6, 1959 |

FOREIGN PATENTS

| 522,851 | Canada | Mar. 20, 1956 |

OTHER REFERENCES

McGhee: New Oil Emulsion Speeds West Texas Drilling—Article in the Oil and Gas Journal, Aug. 13, 1956, pages 110, 111, and 112.

Mallory: How Low Solids Muds Can Cut Drilling Costs—Article in the Petroleum Engineer, April, 1957, pages B21, B22, B23, and B24.